(12) United States Patent
Chandra et al.

(10) Patent No.: US 11,004,350 B2
(45) Date of Patent: May 11, 2021

(54) COMPUTERIZED TRAINING VIDEO SYSTEM

(71) Applicant: Walmart Apollo, LLC, Bentonville, AR (US)

(72) Inventors: Ankur Chandra, Whitefield (IN); Jai Deep Mulchandani, Ajmer (IN)

(73) Assignee: Walmart Apollo, LLC, Bentonville, AR (US)

( * ) Notice: Subject to any disclaimer, the term of this patent is extended or adjusted under 35 U.S.C. 154(b) by 363 days.

(21) Appl. No.: 16/031,161

(22) Filed: Jul. 10, 2018

(65) Prior Publication Data

US 2019/0371192 A1 Dec. 5, 2019

(30) Foreign Application Priority Data

May 29, 2018 (IN) .............................. 201841020021

(51) Int. Cl.
| | |
|---|---|
| *G09B 5/02* | (2006.01) |
| *G09B 5/04* | (2006.01) |
| *G11B 27/031* | (2006.01) |
| *G11B 27/10* | (2006.01) |
| *G06F 16/93* | (2019.01) |
| *G06F 16/74* | (2019.01) |
| *G06F 40/221* | (2020.01) |
| *G10L 13/00* | (2006.01) |

(52) U.S. Cl.
CPC ............. *G09B 5/04* (2013.01); *G06F 16/743* (2019.01); *G06F 16/93* (2019.01); *G06F 40/221* (2020.01); *G10L 13/00* (2013.01); *G11B 27/031* (2013.01); *G11B 27/10* (2013.01)

(58) Field of Classification Search
CPC .......... G06F 17/27; G06F 3/16; G06F 16/743; G09B 5/02; G09B 5/04; G09B 19/0053
See application file for complete search history.

(56) References Cited

U.S. PATENT DOCUMENTS

| | | |
|---|---|---|
| 5,432,940 A | 7/1995 | Potts et al. |
| 6,374,270 B1 * | 4/2002 | Maimon ................. G06F 16/93 715/210 |
| 6,535,713 B1 | 3/2003 | Houlihan et al. |

(Continued)

OTHER PUBLICATIONS

Unknown, "iSpring Learn Features", Features of iSpring Learn LMS, https://www.ispringsolutions.com/ispring-learn/features, Feb. 22, 2018, 11 pages.

(Continued)

*Primary Examiner* — Omkar A Deodhar

(57) ABSTRACT

The system and method described herein provide a computerized training video system. The computerized training video system may be capable of producing video content for computerized training. A user interface descriptive language (UDL) document describe user interface features of a new or updated application. The computerized training video system may generate a training video based on the UDL document. The training video may be generated on-demand or stored in advance. The training video may be customized for a particular software release, user group. The training video may be personalized on an individual level based on a previous training history, user role, or another characteristic of the user that will view the training video.

20 Claims, 7 Drawing Sheets

(56) References Cited

U.S. PATENT DOCUMENTS

| | | | |
|---|---|---|---|
| 6,590,674 B1* | 7/2003 | Orton | G06F 16/258 |
| | | | 358/1.18 |
| 7,043,193 B1 | 5/2006 | Vashi et al. | |
| 2003/0009742 A1 | 1/2003 | Bass et al. | |
| 2003/0152904 A1 | 8/2003 | Doty, Jr. | |
| 2004/0024898 A1* | 2/2004 | Wan | H04N 21/44012 |
| | | | 709/231 |
| 2010/0138736 A1* | 6/2010 | Wan | H04N 21/23431 |
| | | | 715/234 |
| 2012/0177345 A1* | 7/2012 | Trainer | H04N 21/440236 |
| | | | 386/285 |
| 2012/0185772 A1* | 7/2012 | Kotelly | G11B 27/034 |
| | | | 715/719 |
| 2013/0013998 A1* | 1/2013 | Eykholt | G06F 8/73 |
| | | | 715/229 |
| 2015/0221235 A1 | 8/2015 | Regan et al. | |
| 2015/0324338 A1* | 11/2015 | Levy | G06F 40/186 |
| | | | 715/244 |
| 2017/0039883 A1 | 2/2017 | Hunt et al. | |
| 2017/0040037 A1* | 2/2017 | Hunt | G09B 21/009 |
| 2017/0092332 A1* | 3/2017 | Bostick | G11B 27/002 |
| 2018/0061256 A1* | 3/2018 | Elchik | G06F 40/279 |
| 2018/0068019 A1 | 3/2018 | Novikoff et al. | |

OTHER PUBLICATIONS

Unknown, "On-Demand Learning for Modern Business, Make training a strategic force that drives your business", Mindflash, https://www.mindflash.com/product, Feb. 22, 2018, 6 pages.

Unknown, "The fastest path to awesome learning", Talent LMS—Cloud LMS Solutions, https://www.talentlms.com/, Feb. 22, 2018, pp. 1-3.

Young, Lee W., "International Search Report", International Application No. PCT/US/1926664, dated Jul. 5, 2019, 2 pages.

Young, Lee W., "Written Opinion", International Application No. PCT/US/1926664, dated Jul. 5, 2019, 4 pages.

* cited by examiner

EXAMPLE UDL DOCUMENT

```
{
"appURL": "http://www.newapplication.com",
"appIntroduction": "Welcome to NewApplication!",
"flows": [
  {
  "flowIntroduction": "First, we will learn how to enter data.",
  "actions": [
    {
    "action": "highlight",
    "elementId": "textBox",
    "time": 6000,
    "description": "enter the text input for NewApplication"
    },
    {
    "action": "enterText",
    "elementId": "textBox",
    "text": "demonstration",
    "time": 6000,
    "description": "we entered the text 'demonstration'"
    },
    {
    "action": "highlight",
    "elementId": "submitButton",
    "time": 6000,
    "description": "click on the submit button to go"
    },
    {
    "action": "click",
    "elementId": "submitButton"
    },
    {
    "action": "wait",
    "time": 6000
    },
    {
    "action": "narration",
    "time": 5000,
    "description": "you can see the application results"
    }
  ],
  "flowWindup": "we just learned a basic feature of the application."
  },
  {
  "flowIntroduction": "The application has several features",
  "actions": [
    {
    "action": "get image",
    "elementId": "/training-screenshot1.png",
    "time": 6000,
    "description": "Take a moment to get familiar with the screen"
    },
    {
    "action": "draw pointer",
    "location": "200,500",
    "time": 2000,
    "description": "This area includes custom inputs"
    }
  ],
  "flowWindup": "Hover over an input for tips."
  }
],
"appWindup": "Thank you for attending the training"
}
```

FIGURE 6

COMPUTERIZED TRAINING VIDEO SYSTEM

BACKGROUND

This disclosure generally relates to the field of computerized training, and, more particularly, to video content for computerized training. When a new application (or software tool) is deployed or updated, there may be a desire to train users how to use the new application. This may present problems for a large organization having a large workforce that needs training. Furthermore, an organization may wish to deploy frequent updates to the application. However, the process (or cost) associated with training a workforce may discourage the organization from releasing frequent updates to the software, even if the update may provide new and useful enhancements. The organization may opt for a web-based or computerized training model. Traditional computer-based training may be cumbersome for users, may include irrelevant content for some users, and may be expensive to produce.

SUMMARY

This Summary is provided to introduce a selection of concepts (in a simplified form) that is further described below in the Detailed Description. This Summary is not intended to identify key features or essential features of the claimed subject matter, nor is it intended to be used as an aid in determining the scope of the claimed subject matter.

This disclosure provides a computerized training video system that is capable of producing video content for computerized training. The video content may be compiled to form a training video regarding how to use the features of a new or updated application. In particular, the video content may show user interface features with audio, video, still image, text, or any combination thereof. The computerized training video system may be capable of automating the generation of video content by following a user interface descriptive language (UDL) document. The UDL document may be customized for a particular software release, user group, or personalized on an individual level.

One innovative aspect of the subject matter described in this disclosure can be implemented as a system, apparatus, computer-readable medium, or method for computerized training. A UDL document may describe a user interface associated with a first application. A UDL document parsing unit may be configured to parse the UDL document and determine video clip generation instructions based on the UDL document. A video generation unit may be configured to generate a plurality of video clips in accordance with the video clip generation instructions. A training video compiler may be configured to compile a training video associated with the first application based, at least in part, on the plurality of video clips.

In some implementations, a UDL document receiving unit may be configured to receive the UDL document. The UDL document receiving unit may receive the UDL document via a message generated by the first application. The UDL document receiving unit may receive the UDL document via a network. The UDL document receiving unit may receive an address associated with the UDL document and retrieve the UDL document from a storage location at the address.

In some implementations, a personalization unit may be configured to determine a characteristic of a user that will view the training video. The personalization unit may personalize the video clip generation instructions based, at least in part, on the characteristic of the user. The characteristic may include at least one of a user personal, a user role, a security clearance, and an application platform used by the user.

In some implementations, the UDL document may be formatted as a text-based data structure for organizing information about one or more user interface flows associated with a capability of the user interface. Each user interface flow may include one or more actions.

In some implementations, a video director may be configured to process the video clip generation instructions for each video clip. One or more audio/video components may be configured to generate different portions of each video clip. A combiner may be configured to combine the different portions of each video clip and store a combined video clip.

In some implementations, a synchronizer may be configured to coordinate the timing of an audio portion of the video clip with a video portion of the video clip.

In some implementations, the one or more audio/video components may include one or more of: a user interface automation unit configured to automate user interaction with an application instance of the first application, an image retrieval unit configured to retrieve an image from a storage location, an audio generation unit configured to produce an audio portion of a video clip, and a closed caption generation unit configured to prepare a video representation of the audio portion.

In some implementations, the audio generation unit includes a text-to-speech unit to produce the audio portion based, at least in part, on a text description in the UDL document.

In some implementations, a video output unit configured to provide the training video to a user of the first application.

In some implementations, generating the different portions of each clip may include generating a video portion and an audio portion associated with a user interface flow. The video portion may be generated using a user interface automation unit. The audio portion may be generated using a text-to-speech unit.

In some implementations, the training video may be streamed from the first computer system via a network to a second computer system in which the first application is executable.

In some implementations, the training video may be output using an output device of the first computer system for viewing by a user of the first application.

In some implementations, the first computer system that generates the training video is the same computer system used by a trainee of the first application.

Details of one or more implementations of the subject matter described in this disclosure are set forth in the accompanying drawings and the description below. Other features, aspects, and advantages will become apparent from the description, the drawings, and the claims.

BRIEF DESCRIPTION OF THE DRAWINGS

The present description will be better understood from the following detailed description read in light of the accompanying drawings.

FIG. 6 depicts an example user interface description language (UDL) document.

Corresponding reference characters indicate corresponding parts throughout the drawings. The systems depicted in the figures are illustrated as schematic drawings. Note that the relative dimensions of the figures may not be drawn to scale.

DETAILED DESCRIPTION

Figure 1:
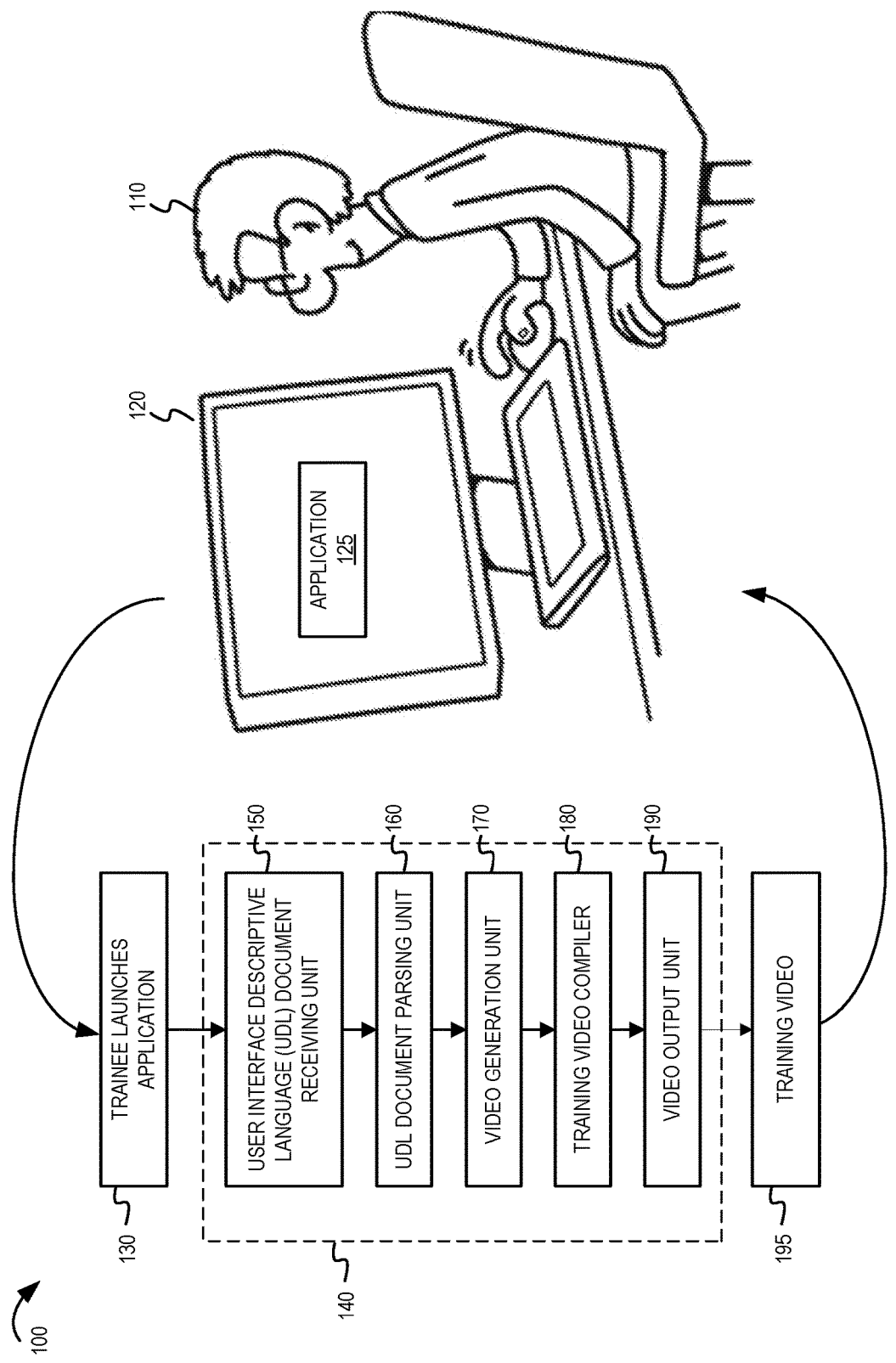
FIG. 1 depicts an example system diagram with example features of a computerized training video system.

The systems and methods described herein provide a computerized training video system. The computerized training video system may produce video content based on a user interface descriptive language (UDL) document. The UDL document may include a description of user interface (UI) features for a new or updated application. The computerized training video system can automatically generate a training video by parsing the UDL document and generating video clips demonstrating the UI features described by the UDL document. Thus, an organization may more easily deploy a new application or new version release while providing video training for a workforce. A trainee may view the training video to learn about the UI features of the application. The cost of producing and deploying training materials can be reduced. Furthermore, the training video can be personalized based on the trainee that will view the training video.

In accordance with this disclosure, a computerized training video system may parse the UDL document to determine video clip generation instructions. For example, the UDL document may include definitions of different user interface flows, and each user interface flow may be made up of different actions. The video clip generation instructions can be used to automate the preparation of video clips showing the user interface flows and actions. A video generation unit may produce the video clips based on the video clip generation instructions. A training video compiler can produce the training video using the video clips.

In one aspect of this disclosure, the video generation unit may use one or more audio/video components to generate portions of the video clips. For example, the video generation unit may use text-to-speech or audio files to generate an audio portion of the video clip. The video generation unit may use still images or video capture to generate a video portion. In some implementations, the video generation unit may utilize a UI automation tool and an application instance to simulate usage of the application while capturing video output of the application instance. The video generation unit may add closed captioning, overlay images, or other techniques to enhance the training video. After producing the training video, the computerized training video system can provide the training video to the trainee.

In one aspect of this disclosure, the training video may be generated on-the-fly (in near real-time) at a time when the training is being sought. The UDL document can be updated anytime the application is updated, such that whenever training is sought, the UDL document will describe the latest features. In some implementations, the computerized training video system may generate the training video on a separate computer system (from the computer being used by the trainee) and streamed to the trainee's computer. Alternatively, the computerized training video system may be implemented on the trainee's computer, and the training video may be generated locally. The training video may be customized based on the capabilities, version information, user login, or other information about the trainee or the trainee's computer.

In another aspect of this disclosure, the UDL document may be personalized based on the trainee that will view the training video. For example, the UDL document may be merged with user information (such as name, location, or other details about the trainee) to customize the UDL document based on a user persona. The UDL document may be abridged by removing features of a previous version of the application which the trainee has already been shown (which may be determined by a training history for the trainee). The UDL document may be customized based on a role of the trainee (such as a manager-level, security clearance, or the like).

Particular implementations of the subject matter described in this disclosure can be implemented to realize one or more of the following potential advantages. An organization may be more likely to deploy frequent updates of an application with new features because the computerized training video system can generate corresponding training videos with little or no administrative oversight. Users (trainees) can receive relevant and timely training on new features of an application. The organization may benefit from improved productivity associated with deploying new features and having a trained workforce.

FIG. 1 depicts an example system diagram with example features of a computerized training video system. The system diagram 100 in FIG. 1 shows a trainee 110 who is executing an application 125 at a computer 120. The application 125 may be a new application or a new version of an updated application. A computerized training video system 140 may detect when the trainee launches the application (shown at block 130). In some implementations, the application 125 itself may invoke the computerized training video system 140—either automatically when launched or in response to a user input requesting training. In other implementations, a helper application or utility (not shown) on the computer 120 may detect when the application 125 is launched and invoke the computerized training video system 140. The computerized training video system 140 may be implemented at the computer 120 or may be implemented at another machine. Upon detecting that the trainee has launched the application, the computerized training video system 140 may generate and provide a training video 195 to the trainee 110. For example, the computerized training video system 140 may stream the training video via a network (if the computerized training video system 140 is implemented on a separate machine). If the computerized training video system 140 is implemented at the computer 120, the computerized training video system 140 may present the training video 195 on an output device (such as a monitor, display, speakers, or a combination thereof) of the computer 120.

FIG. 1 shows some example components of the computerized training video system 140 to aid in understanding how the training video 195 is produced. Further example components are described in FIG. 3. The computerized training video system 140 may include a UDL document receiving unit 150. For example, the UDL document receiving unit 150 may receive the UDL document via a message from the application 125. In some implementations, the application 125 may be a web-based application and may have the UDL document encoded or linked in the web-based application. As an example, the application 125 may include hypertext markup language (HTML) that includes or links to the UDL document. When the application 125 is accessed, the web-based application may send the UDL document to the UDL document receiving unit 150.

A UDL document parsing unit 160 of the computerized training video system 140 may process the UDL document to determine video clip generation instructions. An example of the UDL document is described further in FIG. 6. The UDL document may include multiple user interface flows which describe how to use a particular user interface feature of the application 125. Each user interface flow may include one or more actions or training objectives. The computerized training video system 140 includes a video generation unit 170 and training video compiler 180 which together produce the training video. The video generation unit 170 may use different audio or video components to create video clips of the actions in the user interface flows. In one example, the video generation unit 170 may include a UI automation unit that simulates actions on an application instance and records screen capture or video output from the application instance. Alternatively, the video generation unit 170 may generate video based on still images (such as screenshots, overlay images, or the like). The video generation unit 170 also may produce audio for the video clip. In one example, the audio may be generated by a text-to-speech converter that produces audio content based on a text description in the UDL document. The video generation unit 170 may combine the audio and video portions to generate a video clip for a user interface flow. The training video compiler 180 may compile multiple video clips to produce the training video 195. A video output unit 190 may provide the training video 195 to the trainee 110. In some implementations, the computerized training video system 140 may store all or part of the training video for subsequent use in preparing training videos for user interface flows that are unchanged.

Figure 2:
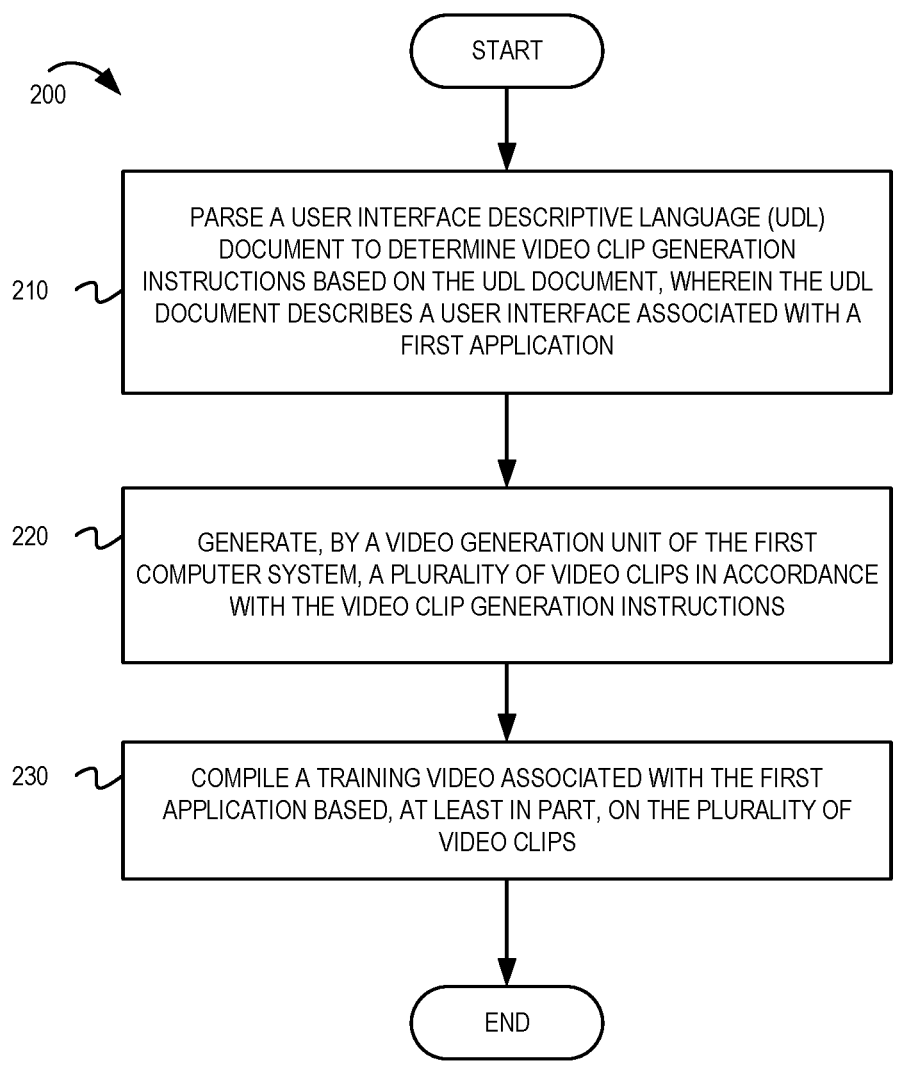
FIG. 2 depicts an example flowchart for the computerized training video system.

FIG. 2 depicts an example flowchart for the computerized training video system. The flowchart 200 begins at block 210. At block 210, the computerized training video system may parse a UDL document to determine video clip generation instructions based on the UDL document. The UDL document may describe a user interface associated with a first application. For example, the UDL document may be formatted as a text-based data structure (such as a JavaScript Object Notation, JSON, structure) for organizing information about one or more user interface flows associated with a capability of the user interface. A user interface flow, in context of this disclosure, may describe a capability or functionality of the user interface. Each user interface flow may include one or more actions. An action, in context of this disclosure, may describe a set of user activities that may be performed in a user interface flow.

At block 220, the computerized training video system may generate, by a video generation unit, a plurality of video clips in accordance with the video clip generation instructions. For example, the video generation unit may use a UI automation unit to simulate the actions in a user interface flow. The video generation unit also may prepare an audio portion (for example, using a text-to-speech unit) to describe the actions. At block 230, the computerized training video system may compile a training video based, at least in part, on the plurality of video clips. The training video may appear to be produced manually, even though it may be generated by automated means and possibly generated in response to a user invoking the first application.

Figure 3:
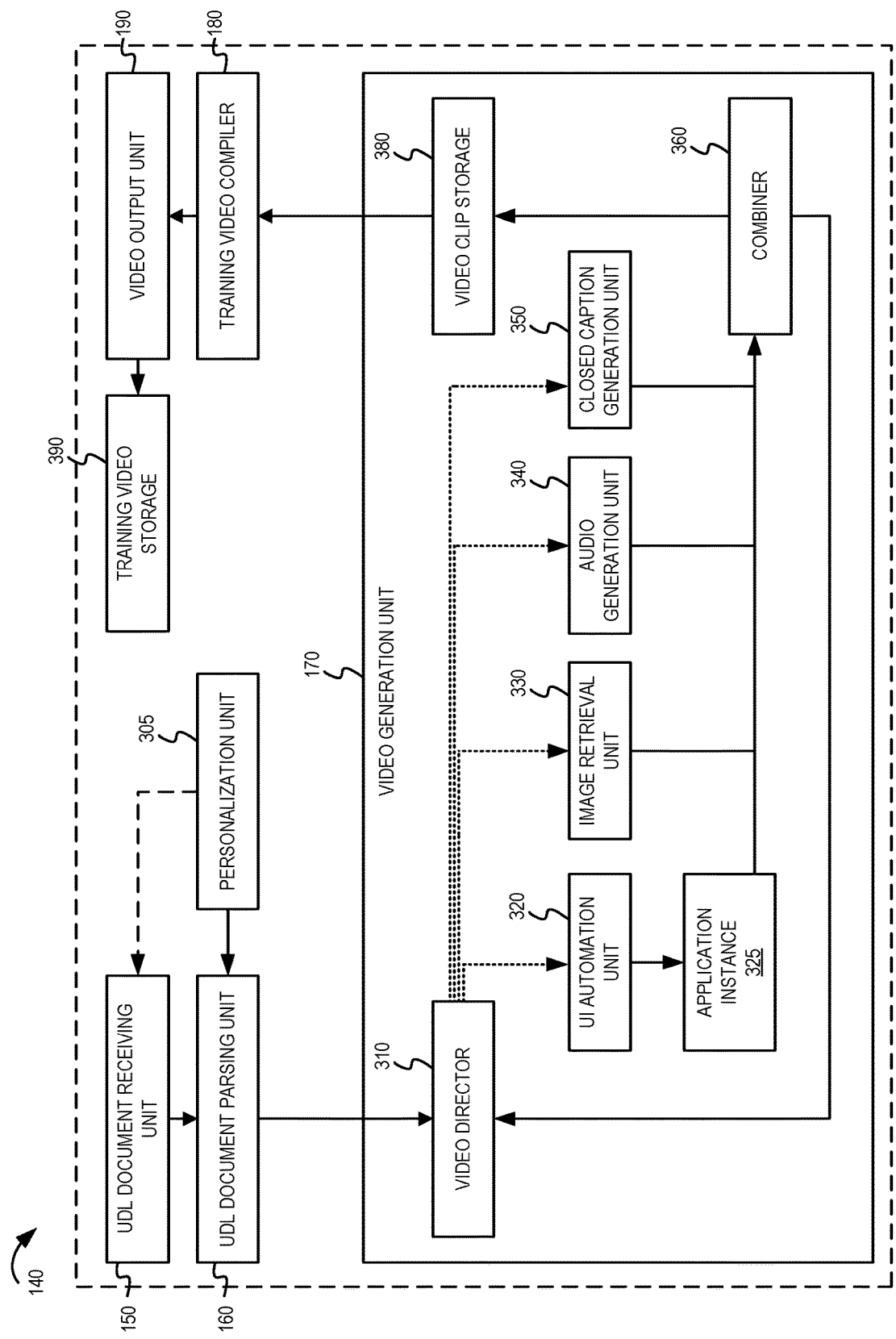
FIG. 3 depicts an example functional block diagram showing example components of a computerized training video system.

FIG. 3 depicts an example functional block diagram showing example components of a computerized training video system 140. The computerized training video system 140 includes similar features as described in FIG. 1, including the UDL document receiving unit 150, the UDL document parsing unit 160, the video generation unit 170, the training video compiler 180, and the video output unit 190. In FIG. 3, the video generation unit 170 is shown with some potential functional blocks to implement video generation. The UDL document parsing unit 160 may parse the UDL document to determine video clip instructions. For example, the UDL document parsing unit 160 may read the UDL document into a data format that is usable by the video generation unit 170. Alternatively, the UDL document parsing unit 160 may translate, convert, organize or otherwise manipulate the descriptions in the UDL document to determine video clip generation instructions based on the actions and user interface flows described in the UDL document. The video generation unit 170 may include a video director 310 that follows the video clip generation instructions to prepare video clips for each user interface flow. The video director 310 may use one or more audio/video (AV) components to generate audio and video portions of the video clip. FIG. 3 does not include an exhaustive list of the AV components which may be used.

In one example AV component, a UI automation unit 320 may simulate a user interaction with an application instance 325. The video generation unit 170 may use screen capturing, output pipelining, or other techniques to capture a video portion from the application instance 325 as the user interaction is stimulated. The video portion may be provided to a combiner 360 which can combine the video portion with other portions of audio or video components.

In another example AV component, an image retrieval unit 330 may retrieve a still image (such as a screenshot or other image) from a storage location and convert the still image to a video portion having a period of time. The period of time may be specified in the UDL document. The video portion from the image retrieval unit 330 may be sent to the combiner 360.

In another example AV component, an audio generation unit 340 may prepare an audio portion based on the video clip generation instructions. The audio portion may be derived from text in the UDL document. For example, a text description related to an action or user interface flow in the UDL document may be converted to an audio portion using text-to-speech conversion. In some implementations, the audio generation unit 340 may use a language-conversion utility to convert the text to a language of the trainee before using the text-to-speech conversion. For example, the language translation may be performed by a language translation unit (not shown). The language translation unit may use various Machine Translation (MT) techniques, including Statistical MT, Neural MT, or the like. In some implementations, the language translation unit may use a custom language conversion utility to convert language specific to the organization, trainee, or application. In another example, the audio generation unit 340 may retrieve an audio file previously stored at a storage location. The audio generation unit 340 may send the audio portion to the combiner 360.

In another example AV component, a closed caption generation unit 350 may produce a video portion based on the text description in the UDL document. The video portion may be an overlay video to provide textual queues for hearing-impaired trainees. The closed caption generation unit 350 may send the video portion to the combiner 360.

This disclosure provides several examples of how the audio and video portions are generated. The implementations of the video generation unit 170 may depend on the platform in which the computerized training video system 140 is implemented. The example AV components may use various techniques to generate the audio portion including speech synthesis engines that implement text-to-speech conversion techniques (such as Diphone Synthesis, Statistical Parametric Synthesis, or the like). Example speech synthesis engines include Festival, Flite, maryTTS, or the like. A selection of the text-to-speech engine may be based on the platform and relative performance of the different engines. The example AV components may use various techniques to generate the video portion including the use of a collection of images, a codec, (such as Ffmpeg, Jcodec, etc.), or the like.

The combiner 360 may combine the audio and video portions to generate a video clip for an action in the user interface flow. In some implementations, the combiner 360 may include a synchronizer to coordinate the timing of an audio portion with a video portion. When the UDL document specifies a single image for an action, the audio can be combined with the single image with relative ease regarding synchronization. In case of multiple audio and video files within an action, the UDL document may include a representational timestamp with each audio and image. The combiner 360 may use the relative timestamp, at the time of compilation of video, to synchronize the audio and video portions. Other techniques may be used by the combiner 360 to synchronize different audio or video portions of the video clip.

The combiner 360 may cause the video clip to be stored in a video clip storage 380. If there are more actions or more user interface flows, the combiner 360 may prompt the video director 310 to continue with a next action or next user interface flow. Thus, the process of preparing video clips through the various AV components may be iterative until the video clip generation instructions of the UDL document have been fully processed by the video director 310.

Once the video clips have been generated and stored in the video clip storage 380, the training video compiler 180 may generate the training video. The video output unit 190 may provide the training video to the trainee. In some implementations, the video output unit 190 may cause the training video to be stored in a training video storage 390. Thus, if a subsequent request for the training video is received and the UDL document is the same, the computerized training video system 140 may retrieve the training video from the training video storage 390 and provide it via the video output unit 190 without re-generating the training video.

Additionally, in some implementations, the video clip storage 380 may be maintained so that the video director 310 may skip some actions or user interface flows that are unchanged since a previous execution of the UDL document.

In some implementations, the computerized training video system 140 may include a personalization unit 305. The personalization unit 305 may be capable of determining one or more characteristics regarding the trainee or the computing environment being used by the trainee. For example, the personalization unit 305 may determine a user persona (name, location, language, or other information about the user) to merge with placeholder tags in the UDL document or in the video clip generation instructions. The personalization unit 305 may maintain (or retrieve) a training history for the trainee and customize the video clip generation instructions (or the UDL document) based on the training history. For example, the UDL document may be abridged to remove sections of the UDL document that are redundant to part of the training history. The personalization unit 305 also may determine a role or security clearance of the trainee. The video clip generation instructions may be customized to include more (or less) user interface flows for features of the application that are available to the trainee based on the trainee's role or security clearance.

Figure 4:
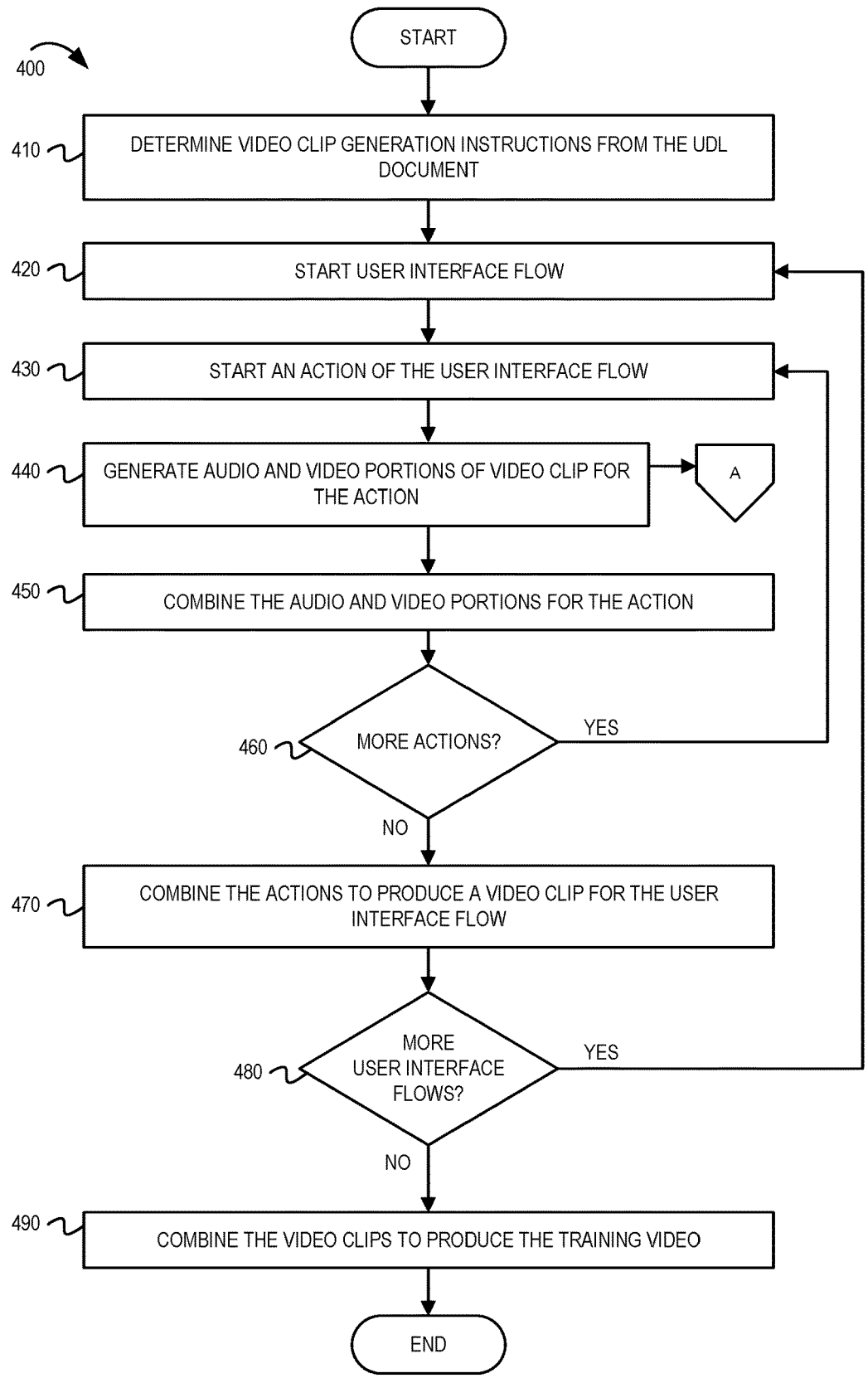
FIG. 4 depicts an example flowchart with example operations for generating a training video.

FIG. 4 depicts an example flowchart with example operations for generating a training video. For example, the flowchart 400 may be executed by the UDL document parsing unit 160, the video generation unit 170 and the training video compiler 180 previously described. The flowchart 400 begins at block 410. At block 410, the UDL document parsing unit may determine video clip generation instructions from the UDL document. For example, the computerized training video system may parse the UDL document. The UDL document may be organized or structured in a variety of ways. In one example, the UDL document may be organized by user interface flows. Each user interface flow may include a set of actions that describe how to operate a particular user interface feature of the application. The video clip generation instructions may organize the actions for each user interface flow and organize the user interface flows. In some implementations, the video clip generation instructions may be sequentially represented so that the actions and user interface flows are performed in a particular order.

At block 420, the video generation unit may start a first user interface flow. Block 420 will be part of a loop to execute each of the user interface flows described in the video clip generation instructions. At block 430, the video generation unit may start a first action of the first user interface flow. Block 430 will be part of a loop to execute each of the actions in each user interface flow.

At block 440, the video generation unit may generate audio and video portions of the video clip associated with the action. Some example tools to generate the audio and video portions are described in FIG. 5 (indicated by off-page reference "A"). At block 450, the video generation unit may combine the audio and video portions for the action.

At decision 460, the video generation unit may determine if the video clip generation instructions include more actions for the first user interface flow. If so, the flowchart may return to block 430 to perform the operations at blocks 440 and 450, recursively, for each action in the user interface flow. Once all the actions for the user interface flow have been processed, the flow may branch to block 470 from decision 460. At block 470, the video generation unit may combine the content for the actions to produce a video clip for the user interface flow.

At decision 480, the video generation unit may determine if the video clip generation instructions include another user interface flows. If so, the flowchart may return to block 420 to perform the operations at blocks 430-470, recursively, for each user interface flow. Once all the user interface flows have been processed, the flow may branch to block 490 from decision 480. At block 480, the training video compiler unit may combine the video clips to produce the training video.

Figure 5:
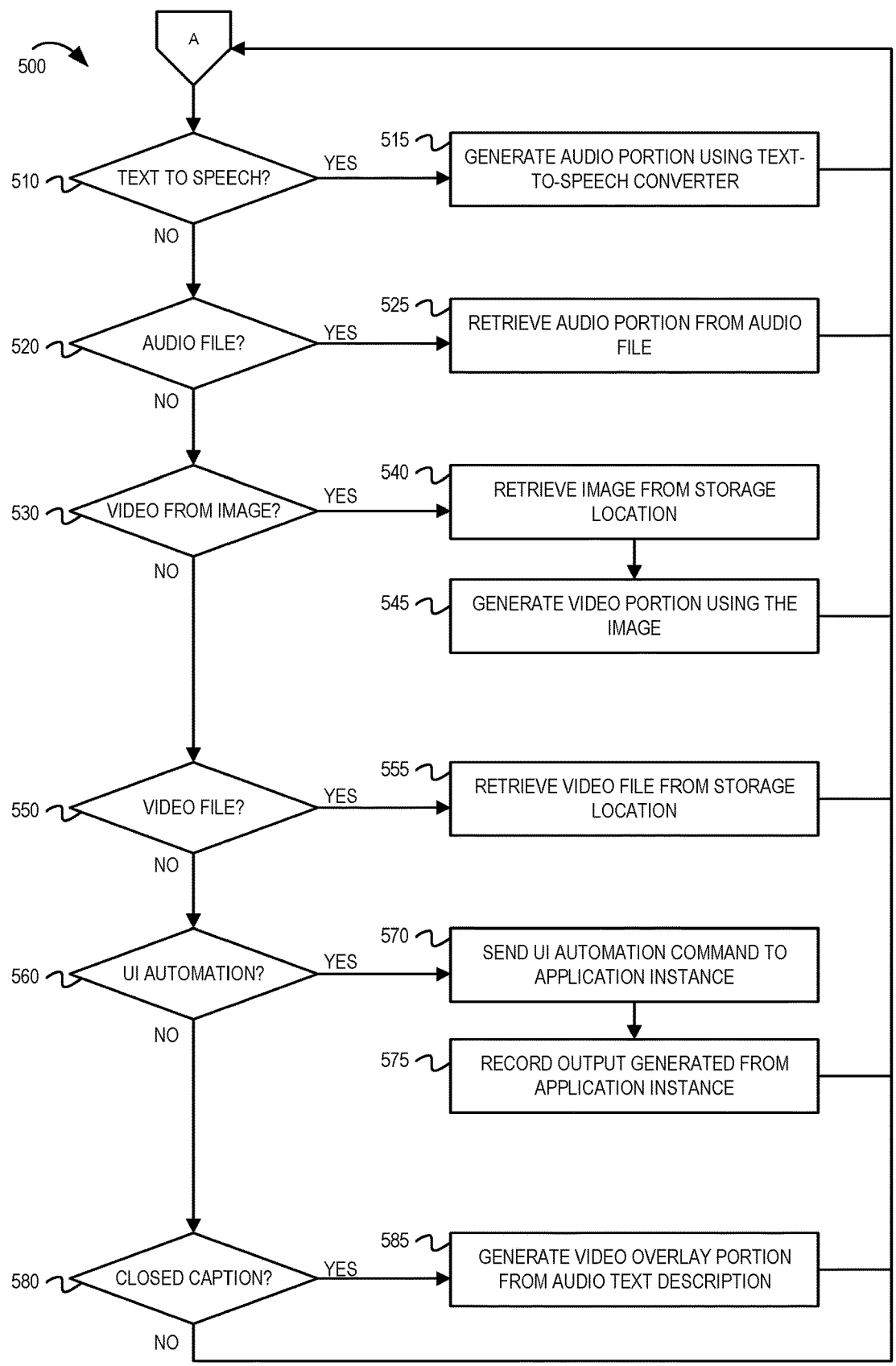
FIG. 5 depicts an example flowchart with example operations for generating audio and video portions of a video clip.

FIG. 5 depicts an example flowchart with example operations for generating audio and video portions of a video clip. Starting with reference "A," the flowchart 500 may begin at decision 510. The flowchart 500 may recursively process the video clip generation instructions for an action or for multiple actions of a user interface flow.

At decision 510, if the video clip generation instruction indicates a text-to-speech instruction, the flow may continue to block 515 where the video generation unit may generate an audio portion using a text-to-speech converter. Otherwise, if the video clip generation instruction does not indicate the text-to-speech instruction, the flow may continue to decision 520.

At decision 520, if the video clip generation instruction indicates a storage location for an audio file, the flow may continue to block 525 where the video generation unit may retrieve the audio file and obtains the audio portion from the audio file. Otherwise, if the video clip generation instruction does not indicate the storage location for the audio file, the flow may continue to decision 530.

At decision 530, if the video clip generation instruction indicates a storage location for an image file, the flow may continue to block 540 where the video generation unit may retrieve the image file. At block 545, the video generation unit may generate a video portion using the image file. Otherwise, if the video clip generation instruction does not indicate the storage location for the image file, the flow may continue to decision 550.

At decision 550, if the video clip generation instruction indicates a storage location for a video file, the flow may continue to block 555 where the video generation unit may retrieve the video file and obtains the video portion from the video file. Otherwise, if the video clip generation instruction does not indicate the storage location for the video file, the flow may continue to decision 560.

At decision 560, if the video clip generation instruction indicates a UI automation instruction, the flow may continue to block 570 where the video generation unit sends a UI automation command to an application instance. The UI automation command may simulate a user interaction with the application instance. At block 575, the video generation unit may record the output generated by the application instance. Otherwise, if the video clip generation instruction does not indicate the UI automation instruction, the flow may continue to decision 580.

At decision 580, if the video clip generation instruction indicates a closed caption instruction, the flow may continue to block 585 where the video generation unit generates a video portion using a text description for the action in the UDL document. Otherwise, if the video clip generation instruction does not indicate the closed caption instruction, the flow may return to the beginning at reference "A."

From each of the blocks 515, 525, 545, 555, 575, and 585, the flow may return to the beginning at reference "A" to produce any further audio or video portions associated with the action.

FIG. 6 depicts an example UDL document. The example UDL document 600 is provided solely as an example. Many various of documenting format, keywords, or structures may be defined for a scripting language used in the UDL document. In one example, the UDL document may be formatted based on JSON document structure. The textual descriptions (such as introductions, descriptions, and conclusions) may be used to generate audio (text-to-speech) or closed-captioning portions of the video clips.

The UDL document may include general information about the application:

```
{
  "appURL": "http://www.newapplication.com",
  "appIntroduction": "Welcome to NewApplication!",
```

The UDL document may include blocks for each flow, beginning with a user interface flow introduction and one or more actions associated with the flow:

```
"flows": [
{
  "flowIntroduction": "First, we will learn how to enter data.",
```

"actions": [The UDL document may UI automation instructions associated with interactions with particular UI elements of the application. Each action may have a text description which could be used for a text-to-speech audio portion or a closed caption portion. A time period may be specified for how long the action should be represented in the video clip for the user interface flow:

```
{
  "action": "highlight",
  "elementId": "textBox",
  "time": 3000,
  "description": "enter the text input for NewApplication"
},
{
  "action": "enterText",
  "elementId": "textBox",
    "text": "demonstration",
  "time": 3000,
  "description": "we entered the text 'demonstration'"
},
{
  "action": "highlight",
  "elementId": "submitButton",
  "time": 3000,
  "description": "click on the submit button to go"
},
{
  "action": "click",
  "elementId": "submitButton"
},
{
  "action": "wait",
  "time": 3000
},
{
  "action": "narration",
  "time": 5000,
  "description": "you can see the application results"
}
],
```

After completing the actions for the first user interface flow, a conclusion for the user interface flow may be included. Then the next user interface flow may be introduced:

```
"flowWindup": "we just learned a basic operation of this application."
},
{
  "flowIntroduction": "The application has several features",
  "actions": [
```

In the example UDL document 600, the second user interface flow includes instructions to obtain an image file, sequentially draw overlay objects (pointers) with associated text-to-speech (or closed captioning, or both) text descriptions to show different portions of the image file:

```
{
  "action": "get image",
  "elementId": "http://www.newapplication.com/training-screenshot1.png",
  "time": 3000,
  "description": "The application provides an intuitive user interface"
},
{
  "action": "draw pointer",
  "location": "200,500",
  "time": 2000,
  "description": "This area includes custom inputs"
},
{
  "action": "draw pointer",
  "location": "700,200",
  "time": 2000,
  "description": "This area shows export options"
  {
  ],
  "flowWindup": "Click the help icon on any page to see further video training."
  },
],
```

After each of the user interface flows have been described, the UDL document may include a conclusion or other final descriptions for the training video:

```
"appWindup": "Thank you for attending the training. Let's start exploring!!!"
}
```

Additional Example Scenarios

Aspects of the disclosure enable various additional scenarios. For example, the UDL document may be embedded in a web-page to aid a computer user to learn about the user interface objects of the web-page. In some other scenarios, the video generation and UDL may be used for non-training purposes. For example, the UDL document may be used for automated generation of video archives of previous versions of an application.

In some implementations, the UDL document may be generated manually by a developer or training instructor associated with the application. Alternatively, a graphical user interface (GUI) tool may be used to generate a visual model of the UDL document, while the UDL document may be generated by a compiler processing the visual model.

In another example, the UDL document may be generated by recording a trainer's user interactions with an application and microphone input. A speech-to-text converter may convert the microphone input into text descriptions that can be stored along with a text representation of the recorded trainer's user interactions.

In another example, the UDL document may be generated automatically by a UDL document generation utility. The UDL document generation utility may retrieve files associated with the application and prepare the UDL document based on portions of the files. For example, an application that is web-based may include embedded tags or descriptors in the HTML file or files for the application. The UDL document generation utility may retrieve the HTML file and scrape or extract the information in the embedded tags or descriptors to automatically create the UDL document.

Example Operating Environment

Figure 7:
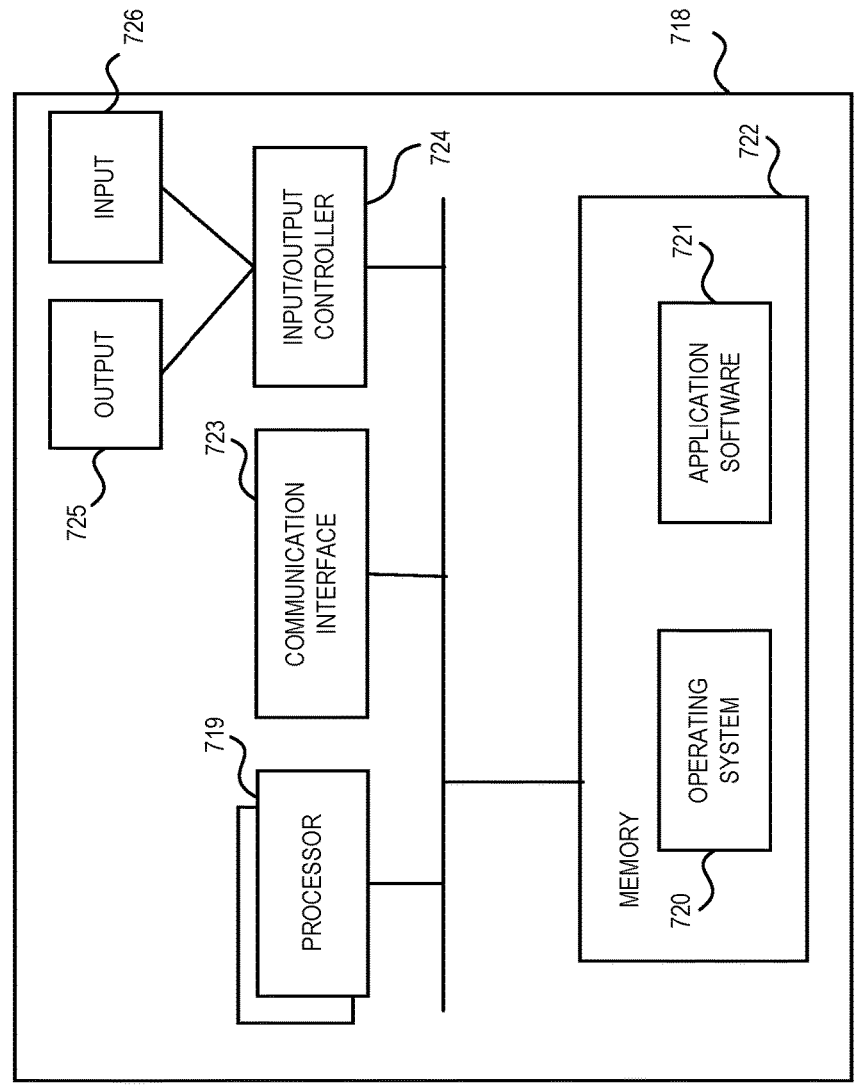
FIG. 7 depicts an example functional block diagram of an operating environment in which some aspects of this disclosure may be implemented.

FIG. 7 depicts an example functional block diagram of an operating environment in which some aspects of this disclosure may be implemented. In FIG. 7, a computing apparatus 718 may implement some or all of the computerized training video system described herein. In some implementations, components of a computing apparatus 718 may be implemented as a part of an electronic device according to one or more embodiments described in this specification. The computing apparatus 718 may comprise one or more processors 719 which may be microprocessors, controllers or any other suitable type of processors for processing computer-executable instructions to control the operation of the electronic device. Platform software comprising an operating system 720 or any other suitable platform software may be provided on the apparatus 718 to enable application software 721 to be executed on the device. According to an embodiment, identifying a product, obtaining value per weight data and weight data associated with the product, and generating a digital product label including product ID data and product value data of the product as described herein may be accomplished by software.

Computer-executable instructions may be provided using any computer-readable media that are accessible by the computing apparatus 718. Computer-readable media may include, for example, computer storage media such as a memory 722 and communications media. Computer storage media, such as a memory 722, includes volatile and non-volatile, removable and non-removable media implemented in any method or technology for storage of information such as computer-readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g., using a communication interface 723).

The computing apparatus 718 may comprise an input/output controller 724 configured to output information to one or more output devices 725, for example, a display or a speaker, which may be separate from or integral to the electronic device. The input/output controller 724 may also be configured to receive and process an input from one or more input devices 726, for example, a keyboard, a microphone or a touchpad. In one embodiment, the output device 725 may also act as the input device. An example of such a device may be a touch-sensitive display. The input/output controller 724 may also output data to devices other than the output device, e.g., a locally connected printing device. In some embodiments, a user may provide input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternative Combinations

While the aspects of the disclosure have been described in terms of various examples with their associated operations, a person skilled in the art would appreciate that a combination of operations from any number of different examples is also within the scope of the aspects of the disclosure. Alternatively, or in addition to the other examples described herein, examples include any combination of the following:

- a UDL document parsing unit configured to parse a UDL document and determine video generation instructions based on the UDL document;
- a UDL document that describes a user interface associated with a first application;
- a video generation unit configured to generate a plurality of video clips in accordance with the video clip generation instructions;
- a training video compiler configured to compile a training video associated with the first application based, at least in part, on the plurality of video clips;
- a UDL document receiving unit configured to receive the UDL document;
- wherein the UDL receiving unit is configured to receive the UDL document via a network;
- wherein the UDL receiving unit is configured to receive the UDL document via a message generated by the first application;
- wherein the UDL receiving unit is configured to receive an address associated with the UDL document and retrieve the UDL document from a storage location at the address;
- wherein the UDL receiving unit is configured to receive characteristics of a user that will view the training video and generate the UDL document based on the characteristics;
- a personalization unit configured to determine a characteristic of a user that will view the training video;
- the personalization unit configured to personalize the video clip generation instructions based, at least in part, on the characteristic of the user;
- wherein the characteristic includes at least one of a user personal, a user role, a security clearance, and an application platform used by the user;
- wherein the UDL document is formatted as a text-based data structure for organizing information about one or more user interface flows associated with a capability of the user interface, each user interface flow including one or more actions;
- a video director for processing the video clip generation instructions for each video clip;
- one or more audio/video components for generating different portions of each video clip;
- a combiner configured to combine the different portions of each video clip and store a combined video clip;
- a synchronizer to coordinate timing of an audio portion of the video clip with a video portion of the video clip;
- a user interface automation unit configured to automate user interaction with an application instance of the first application;
- an image retrieval unit configured to retrieve an image from a storage location;
- an audio generation unit configured to produce an audio portion of a video clip;
- a closed caption generation unit configured to prepare a video representation of the audio portion;
- a text-to-speech unit to produce the audio portion based, at least in part, on a text description in the UDL document;

a video output unit configured to provide the training video to a user of the first application;
parsing a UDL document to determine video clip generation instructions based on the UDL document;
generating, by a video generation unit of the first computer system, a plurality of video clips in accordance with the video clip generation instructions;
compiling a training video associated with the first application based, at least in part, on the plurality of video clips;
receiving the UDL document via a message generated by the first application;
receiving the UDL document via a network;
receiving an address associated with the UDL document and retrieving the UDL document from a storage location at the address;
receiving characteristics of a user that will view the training video and generating the UDL document based on the characteristics;
determining a characteristic of a user that will view the training video;
personalizing the video clip generation instructions based, at least in part, on the characteristic of the user, wherein the characteristic includes at least one of a user personal, a user role, a security clearance, and an application platform used by the user;
processing the video clip generation instructions for each video clip;
generating, by one or more audio/video components of the video generation unit, different portions of each video clip;
combining the different portions of each video clip;
storing a combined video clip;
generating a video portion associated with a user interface flow, wherein the video portion is generated using a user interface automation unit;
generating an audio portion associated with a user interface flow, wherein the audio portion is generated using a text-to-speech unit;
automating user interaction with an application instance of the first application;
retrieving an image from a storage location;
producing an audio portion of a video clip;
preparing a video representation of the audio portion;
using a text-to-speech unit to produce the audio portion based, at least in part, on a text description in the UDL document;
streaming the training video from the first computer system via a network to a second computer system at which the first application is executable;
outputting the training video using an output device of the first computer system for viewing by a user of the first application;
wherein the first computer system that generates the training video is a same computer system used by a trainee of the first application;
means for parsing a UDL document to determine video clip generation instructions based on the UDL document
means for generating, by a video generation unit of the first computer system, a plurality of video clips in accordance with the video clip generation instructions;
means for compiling a training video associated with the first application based, at least in part, on the plurality of video clips;
means for receiving the UDL document via a message generated by the first application;
means for receiving the UDL document via a network;
means for personalizing the UDL document based, at least in part, on a characteristic of a user that will view the training video, wherein the characteristic includes at least one of a user personal, a user role, a security clearance, and an application platform used by the user;
means for processing the video clip generation instructions for each video clip;
means for generating, by one or more audio/video components of the video generation unit, different portions of each video clip;
means for combining the different portions of each video clip; and
means for storing the combined video clip.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The phrase "based on" is used in this specification to represent influenced by, including, or derived from the feature(s) or act(s) followed thereafter. The phrase "based on" may be synonymous to the phrase "based, at least in part, on."

In some examples, the operations illustrated in the figures may be implemented as software instructions encoded on a computer-readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for computerized training, the system comprising:
a user interface descriptive language (UDL) document parser configured to parse a UDL document and determine video clip generation instructions based, at least in part, on the UDL document, wherein the UDL document describes a user interface associated with a first application, and wherein the UDL document parser is configured to parse the UDL document in real-time responsive to the first application being launched;
a video generator configured to generate a plurality of video clips in accordance with the video clip generation instructions; and
a training video compiler configured to compile a training video associated with the first application based, at least in part, on the plurality of video clips.

2. The system of claim 1, further comprising:
a UDL document receiver configured to receive the UDL document, wherein the UDL document receiver is configured to perform at least one operation selected from a group consisting of:
receiving the UDL document via a message generated by the first application;
receiving the UDL document via a network; and
receiving an address associated with the UDL document and retrieving the UDL document from a storage location at the address.

3. The system of claim 1, further comprising:
a personalizer configured to determine a characteristic of a user that launches the training video and personalize the video clip generation instructions based, at least in part, on the characteristic of the user, wherein the characteristic includes at least one of a user personal, a user role, a security clearance, and an application platform used by the user,
wherein the video clip generation instructions are personalized by merging characteristic tags with placeholder tags found in the UDL document.

4. The system of claim 1, wherein the UDL document is formatted as a text-based data structure for organizing information about one or more user interface flows associated with a capability of the user interface, each user interface flow including one or more actions.

5. The system of claim 1, wherein the video generator comprises:
a video director for processing the video clip generation instructions for each video clip;
one or more audio/video components for generating different portions of each video clip; and
a combiner configured to combine the different portions of each video clip and store a combined video clip.

6. The system of claim 5, wherein the combiner is configured to coordinate timing of an audio portion of the video clip with a video portion of the video clip.

7. The system of claim 5, wherein the one or more audio/video components include at least one member selected from a group consisting of:
a user interface automator configured to automate user interaction with an application instance of the first application;
an image retrieval unit retriever configured to retrieve an image from a storage location;
an audio generator configured to produce an audio portion of a video clip; and
a closed caption generator configured to prepare a video representation of the audio portion.

8. The system of claim 7, wherein the audio generator uses text-to-speech to produce the audio portion based, at least in part, on a text description in the UDL document.

9. The system of claim 1, further comprising:
a video outputter configured to provide the training video to a user of the first application.

10. A method performed by a first computer system for producing computerized training content, the method comprising:
parsing a user interface descriptive language (UDL) document to determine video clip generation instructions based, at least in part, on the UDL document, wherein the UDL document describes a user interface associated with a first application, and wherein the UDL document is parsed in real-time responsive to the first application being launched;
generating, by a video generator of the first computer system, a plurality of video clips in accordance with the video clip generation instructions;
compiling a training video associated with the first application based, at least in part, on the plurality of video clips.

11. The method of claim 10, further comprising:
receiving the UDL document, wherein receiving the UDL document includes at least one member selected from a group consisting of:
receiving the UDL document via a message generated by the first application;
receiving the UDL document via a network; and
receiving an address associated with the UDL document and retrieving the UDL document from a storage location at the address.

12. The method of claim 10, further comprising:
determining a characteristic of a user that launches the training video; and
personalizing the video clip generation instructions based, at least in part, on the characteristic of the user by merging characteristic tags with placeholder tags found in the UDL document, wherein the characteristic includes at least one of a user personal, a user role, a security clearance, and an application platform used by the user.

13. The method of claim 10, further comprising:
processing the video clip generation instructions for each video clip;
generating, by one or more audio/video components of the video generator, different portions of each video clip;
combining the different portions of each video clip; and
storing a combined video clip.

14. The method of claim 13, wherein generating the different portions of each clip includes:
generating a video portion associated with a user interface flow, wherein the video portion is generated using a user interface automation unit; and
generating an audio portion associated with a user interface flow, wherein the audio portion is generated using text-to-speech.

15. The method of claim 13, wherein generating the different portions of each video clip includes at least one operation selected from a group consisting of:
- automating user interaction with an application instance of the first application; retrieving an image from a storage location;
- producing an audio portion of a video clip; and
- preparing a video representation of the audio portion.

16. The method of claim 10, further comprising streaming the training video from the first computer system via a network to a second computer system in which the first application is executable.

17. The method of claim 10, further comprising outputting the training video using an output device of the first computer system for viewing by a user of the first application.

18. The method of claim 10, wherein the first computer system that generates the training video is a same computer system used by a trainee of the first application.

19. A system for generating a training video, the system comprising:
- a processor; and
- a memory storing instructions which, when executed by the processor, cause the processor to:
  - receive a user interface descriptive language (UDL) document, wherein the UDL document describes a user interface associated with a first application;
  - parse the UDL document to determine video clip generation instructions based, at least in part, on the UDL document, wherein the video clip generation instructions include a plurality of user interface flows associated with a plurality of video clips, and wherein the UDL document is parsed in real-time responsive to the first application being launched;
  - for each user interface flow:
    - generate a video portion associated with the user interface flow, wherein the video portion is generated using either a screenshot image or a user interface automator;
    - generate an audio portion associated with the user interface flow, wherein the audio portion is generated using either an audio file or text-to-speech; and
    - combine the video portion and the audio portion to produce a video clip for the user interface flow;
  - compile the training video based, at least in part, on the plurality of video clips; and
  - cause the training video to be presented to a user of the first application.

20. The system of claim 19, wherein;
the video clip generation instructions are personalized for the user based, at least in part, on a characteristic of the user that will view the training video, wherein the characteristic includes at least one of a user personal, a user role, a security clearance, and an application platform used by the user to execute the first application, and
the video clip generation instructions are personalized by merging characteristic tags with placeholder tags found in the UDL document.

* * * * *